US012247416B2

(12) United States Patent
Hörberg et al.

(10) Patent No.: US 12,247,416 B2
(45) Date of Patent: Mar. 11, 2025

(54) ELECTROMECHANICAL LOCK ASSEMBLY

(71) Applicant: Swedlock AB, Halmstad (SE)

(72) Inventors: Johan Hörberg, Halmstad (SE); Magnus Nilsson, Varberg (SE); Martin Lindvall, Simlångsdalen (SE)

(73) Assignee: Swedlock AB, Halmstad (SE)

( * ) Notice: Subject to any disclaimer, the term of this patent is extended or adjusted under 35 U.S.C. 154(b) by 257 days.

(21) Appl. No.: 17/754,270

(22) PCT Filed: Oct. 1, 2020

(86) PCT No.: PCT/SE2020/050925
§ 371 (c)(1),
(2) Date: Mar. 29, 2022

(87) PCT Pub. No.: WO2021/066720
PCT Pub. Date: Apr. 8, 2021

(65) Prior Publication Data
US 2022/0381061 A1 Dec. 1, 2022

(30) Foreign Application Priority Data
Oct. 3, 2019 (SE) .................................... 1951130-2

(51) Int. Cl.
*E05B 45/06* (2006.01)
*E05B 35/00* (2006.01)
(Continued)

(52) U.S. Cl.
CPC ............ *E05B 45/06* (2013.01); *E05B 35/001* (2013.01); *E05B 67/24* (2013.01); *E05B 67/38* (2013.01);
(Continued)

(58) Field of Classification Search
CPC ........ E05B 45/06; E05B 35/001; E05B 67/24; E05B 67/38; E05B 2045/064;
(Continued)

(56) References Cited

U.S. PATENT DOCUMENTS 5,816,083 A * 10/1998 Bianco .................... E05B 39/00 70/462
6,155,089 A * 12/2000 Hurskainen ......... E05B 47/0642 70/366
(Continued)

FOREIGN PATENT DOCUMENTS

| | | | |
|---|---|---|---|
| CN | 202689700 | U | 1/2013 |
| CN | 110176092 | A | 8/2019 |
| EP | 1321901 | A2 | 6/2003 |

OTHER PUBLICATIONS

Notice mailed Apr. 28, 2022, issued in corresponding Swedish Patent Application No. P1951130-2, filed Oct. 3, 2019, 5 pages.
(Continued)

*Primary Examiner* — Eugene G Byrd
*Assistant Examiner* — James Edward Ignaczewski
(74) *Attorney, Agent, or Firm* — Christensen O'Connor Johnson Kindness PLLC

(57) ABSTRACT

An electromechanical lock assembly (1) comprising a lock body (13), a lock core (21) located at least partially within the lock body (13) and selectively rotatable with respect to the lock body (13), the lock core (21) including a key receptacle (23), a bolt operating member rotationally secured to the lock core (21) and configured to move a lock bolt of a lock (3) for locking and unlocking said lock (3), and a programmable key (12), wherein said electromechanical lock assembly is configured to be powered upon insertion of the programmable key (12) in said key receptacle (23). A
(Continued)

position sensing device (27) is arranged to transmit position data to said programmable key (12).

12 Claims, 7 Drawing Sheets

(51) Int. Cl.
*E05B 67/24* (2006.01)
*E05B 67/38* (2006.01)
*G07C 9/00* (2020.01)

(52) U.S. Cl.
CPC ... *E05B 2045/064* (2013.01); *E05B 2045/065* (2013.01); *G07C 9/00174* (2013.01); *G07C 2009/00992* (2013.01); *G07C 2209/62* (2013.01)

(58) Field of Classification Search
CPC .......... E05B 2045/065; G07C 9/00174; G07C 2009/00992; G07C 2209/62
See application file for complete search history.

(56) References Cited

U.S. PATENT DOCUMENTS 10,422,163 B1 * 9/2019 Cabral Herrera ....... E05B 67/22
11,639,617 B1 * 5/2023 Farber ................ G07C 9/00174 70/278.7
2001/0027671 A1 * 10/2001 Davis .................. E05B 17/2092 70/278.3
2003/0160681 A1 8/2003 Menard et al.
2004/0124967 A1 * 7/2004 Lange ................ G07C 9/00817 340/5.64
2007/0107476 A1 * 5/2007 Ruan ....................... E05B 67/02 70/38 A
2008/0036596 A1 * 2/2008 Auerbach ............. G09F 3/0329 340/542
2010/0154487 A1 * 6/2010 Cheung ................. E05B 17/142 70/35
2015/0184423 A1 * 7/2015 Chen ....................... E05B 67/24 70/344
2015/0292244 A1 10/2015 Beatty
2018/0038135 A1 2/2018 Cooper
2020/0242868 A1 * 7/2020 Gengler ............. G07C 9/00944

OTHER PUBLICATIONS

International Search Report and Written Opinion mailed Dec. 11, 2020, issued in corresponding International Patent Application No. PCT/SE2020/050925, filed Oct. 1, 2020, 14 pages.
Notice mailed Jun. 9, 2023, issued in corresponding Swedish Patent Application No. P1951130-2, filed Oct. 3, 2019, 5 pages.
Extended European Search Report mailed Oct. 9, 2023, issued in EP Application No. 20870740.6, filed Oct. 1, 2020, 8 pages.

* cited by examiner

ELECTROMECHANICAL LOCK ASSEMBLY

TECHNICAL FIELD

The present invention relates to an electromechanical lock assembly comprising a lock body, a lock core located at least partially within the lock body and selectively rotatable with respect to the lock body, the lock core including a key receptacle, a bolt operating member rotationally secured to the lock core and configured to move a lock bolt of a lock for locking and unlocking said lock, and a programmable key, wherein said electromechanical lock assembly is configured to be powered upon insertion of a programmable key in said key receptacle.

The present invention also relates to method of providing information about a status of an electromechanical lock

BACKGROUND

Document EP 2 592 601 B1 reveals electromechanical key locks, which for locking and unlocking are powered by insertion and actuation of programmable keys. Locking and unlocking of a lock using such a programmable key is rendered possible only if the programmable key is synchronized appropriately. In other words, a programmable key does not in itself provide any access. Such electromechanical locks may be used in a wide range of applications.

However, the use of such electromechanical key locks may be limited due to specific safety and/or security requirements.

SUMMARY OF THE INVENTION

An object of the present invention is to at least partly overcome the above-mentioned drawbacks and to provide an improved electromechanical lock assembly.

According to a first aspect of the invention, this and other objects are achieved, in full or at least partly, by an electromechanical lock assembly comprising a lock body, a lock core located at least partially within the lock body and selectively rotatable with respect to the lock body, the lock core including a key receptacle, a bolt operating member rotationally secured to the lock core and configured to move a lock bolt of a lock for locking and unlocking said lock, and a programmable key, wherein said electromechanical lock assembly is configured to be powered upon insertion of the programmable key in said key receptacle and wherein a position sensing device is arranged to transmit position data to said programmable key.

The lock assembly may form part of an electromechanical lock, such as, e.g., an electromechanical cylinder lock or an electromechanical padlock, arranged to prevent unauthorized access to e.g. a property, an entrance, or a cabinet, and enables a locking solution that can be used with a high level of security in a wide variety of applications.

The position sensing device may allow to detect if an associated lock is situated in a correct or incorrect position, and/or if the lock core of an associated lock is situated in a position that corresponds to a locked state of the associated lock and thereby to detect if such an associated lock is locked as intended, which provides for a high level of security. Also, it may be possible to detect other positions of the key/lock core and the direction of the key/lock core rotation.

The position sensing device enables tracking of user activity, e.g. locking and unlocking of an associated lock, in a reliable manner. The lock assembly thus enables monitoring of the status and/or position of a lock arranged at e.g. a property, an entrance, a drugs cabinet, a road barrier or a manhole cover. The position sensing device thus enables to detect if a lock is locked properly or not. This has the advantage that a user, such as an operator that has access to a locked space, that leaves the space without locking the lock, and/or leaves the space with the lock in an incorrect position, can be alerted an asked to come back and lock the lock and/or position the lock in a predefined position.

By transmitting lock core position data and/or lock position data to a programmable key, a user may be alerted via the programmable key that a lock, which is intended to prevent unauthorized access to e.g. a cabinet, is not locked as intended, i.e. is unlocked or locked but not located in a correct position, and/or asked to lock the lock in a proper manner before leaving the cabinet out of sight.

Furthermore, an administration unit may receive the lock core position data and/or the lock position data, which may even further improve the security. Therefore, it may be used in applications that requires a very high level of security, i.e. where it is essential to secure that a lock is locked in a proper manner to prevent unauthorized access.

Furthermore, the electromechanical lock assembly enables to track user activity and log events in a log file. Events that the position sensing device detects, such as someone locking and unlocking the door, someone leaving the lock unlocked, someone leaving the lock but in an incorrect position etc. may thus be logged in a log file and transmitted to a mobile device, such as a mobile phone, a cloud based access control system and/or an administration unit.

The position sensing device comprises at least one sensor member which is arranged to detect at least one sensor target. Such a sensor target may comprise a magnetic portion, and/or an inductive portion and/or a capacitive portion, and/or a optical portion and/or a contact portion, that is configured to interact with a sensor member of the position sensing device. According to one embodiment the sensing device comprises an accelerometer or a gyroscope that detects the position of the core in the lock cylinder.

According to one embodiment the sensing device comprises a proximity sensor. Such a sensor, i.e. a sensor able to detect the presence of a nearby object without any physical contact, is advantageous since it is capable of working in harsh environmental conditions.

According to one embodiment said sensing device comprises a hall effect sensor.

According to one embodiment the sensing device comprises a non-contact sensor.

The position sensing device is arranged to detect at least one position of the lock core in the lock body.

According to one embodiment said electromechanical lock assembly further comprises a lock position indicator arranged to interact with said position sensing device, which enables to detect if a lock is positioned and locked in a proper manner. Lock core position data and lock position data may thus be detected.

According to one embodiment said electromechanical lock assembly further comprises a lock body holder configured to hold the lock body in a predefined position.

According to one embodiment said lock holder comprises an engagement portion arranged to interact with said sensing device.

According to one embodiment said engagement portion is configured to be received in an opening formed in said lock body.

According to one embodiment the lock body is cylindrical.

According to one embodiment said lock body form part of a padlock.

According to one embodiment a part of a shackle of said padlock forms an engagement portion arranged to interact with said position sensing device.

According to one embodiment the sensing device comprises a sensor member that is mounted externally on the lock core.

According to one embodiment the position sensing device is arranged to detect a lock body position or a padlock body position.

According to another aspect of the present invention there is provided a method of providing information about a status of an electromechanical lock, said electromechanical lock being configured to be powered upon insertion of a programmable key in a key receptacle of the electromechanical lock, said method comprising detecting lock core position data and/or lock position data using a position sensing device, and transmitting said position data to said programmable key.

This method has the advantage that a high level of security can be maintained, since it enables to, upon absence of a confirmation that a lock has been positioned and/or locked properly, alert a user, such as an operator having access to a locked space, or an administration unit, that the space has been left without locking the lock properly.

According to one embodiment said lock position data comprises the position of a lock body of said electromechanical lock.

According to one embodiment said lock core position data comprises the position of a lock core of said electromechanical lock.

According to one embodiment the method further comprises logging position data and transmitting logged position data to a mobile device or a cloud based control system. This embodiment has the advantage that user activity of a lock can be analyzed in e.g. an investigation.

According to one embodiment, the method comprises, upon absence of a confirmation that the lock is locked and situated in a predefined position, sending an alert to a user of the programmable key.

According to one embodiment the method comprises sending an alert to a user of the programmable key if it is detected that the electromechanical lock is located in an incorrect position and/or if it is detected that the electromechanical lock is unlocked when it is supposed to be locked.

Further advantages and characteristics of the invention emerge from the description below and from the following patent claims.

BRIEF DESCRIPTION OF THE DRAWINGS

The invention will be described in more detail with reference to the appended schematic drawings, which show examples of presently preferred embodiments of the invention.

DESCRIPTION OF PREFERRED EMBODIMENTS

Figure 1A:
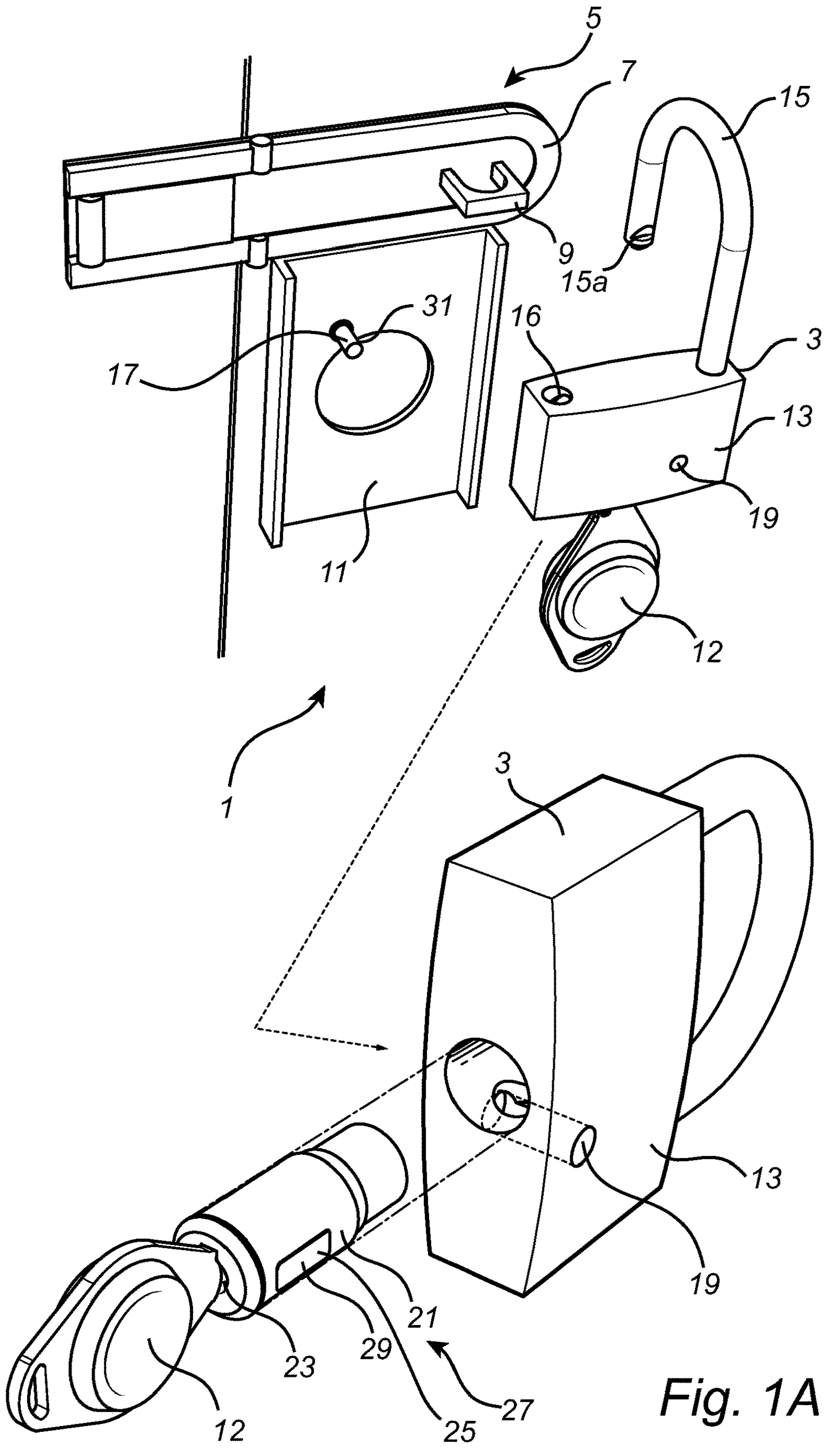
FIG. 1A is a perspective view and illustrates an electromechanical lock assembly according a first embodiment of the invention.

The invention will now for the purpose of exemplification be described in more detailed by means of examples and with reference of the accompanying drawings, in which currently preferred embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 illustrates an electromechanical lock assembly 1 according to an embodiment of the present invention. The electromechanical lock assembly 1 comprises an electromechanical lock in the form of an electromechanical padlock 3. The electromechanical lock assembly 1 is configured to be used together with a lock fitting 5 comprising a hasp 7 and a staple 9. The electromechanical lock assembly 1 further comprises a padlock holder 11 and a programmable key 12. The padlock 3 comprises a padlock body 13 and a shackle 15 having two legs. Upon locking of the padlock 3 an engagement portion 15*a* of the shackle is inserted into a first opening 16 formed in the padlock body 13.

The padlock holder 11 is configured to hold the padlock 3 in a predefined position. To this end the padlock holder 11 comprises a projecting portion, in the form of a projecting pin 17, that is configured to be received in a second opening 19 formed in the padlock body 13.

The padlock 3 comprises a lock core 21 located within the padlock body 13. A fixing device (not shown) is arranged to prevent the lock core 31 from being retracted from the padlock body 17. This fixing device may e.g. comprise balls partly received in an annular groove formed in the padlock body 13 and partly received in an annular groove formed in the lock core 21. The lock core 21 is configured to move a lock bolt member (not shown) of the padlock 3, which lock bolt member is arranged to interact with the locking portion 15*a* of the shackle 15 in a known manner for locking and unlocking the padlock 3. In the lower part of FIG. 1A, the padlock body 13 and the lock core 21 are separated from each other in order to illustrate details of the lock core 21.

The lock core 21, which is selectively rotatable with respect to the padlock body 13, comprises a key receptacle 23 for receiving the programmable key 12. The programmable key 12, which is used to operate the electromechanical padlock 3, comprises an energy source, such as a battery, and a control unit powered by the energy source. The programmable key 12 can access a cloud based or locally hosted access control system which transfer authorization data to the programmable key or log information from the programmable key 12 to the access control system via internet and a synchronization unit or via a mobile communication system such as the GSM net and a mobile device, such as a mobile phone. In one embodiment the mobile device is the key itself. The programmable key 12 access the synchronization unit or the mobile device by a physical contact, by near field communication, such as NFC, or by radio communication, such as Bluetooth. The programmable key 12 can store all data necessary to access at least one specific electromechanical lock 3, but cannot access any electromechanical locks for which it does not have the appropriate authorization data. Locking and unlocking of a lock using the programmable key 12 is rendered possible only if the programmable key is synchronized appropriately via the synchronization unit or a mobile device. Further, the programmable key 12 is provided with means by which electrical power, data and mechanical effort can be transmitted to the lock in a known manner. The electromechanical padlock 3 is configured to be powered by and communicate with the programmable key 12 upon the insertion of the programmable key 12 in the key receptacle 23. To this end the electromechanical padlock 3 comprises power receiving means, communication means and an electrical control unit.

The electromechanical padlock 3 further comprises an access control device 25 for controlling access of a key 12 inserted in the key receptacle 23. Also, the key receptacle of the lock core 21 is configured such that the lock core 21 rotates together with the programmable key 12.

The lock core 21 is rotatable between a first lock core position, in which the padlock 3 is in a locked state, and a second lock core position in which the padlock 3 is in an unlocked state.

The electromechanical lock assembly 1 further comprises a position sensing device 27 arranged to detect position data and transmit position data to the programmable key 12. In this embodiment the position sensing device 27 is arranged to detect a position of the lock core 21 in the padlock body 13 and a position of the padlock body 13.

To this end the position sensing device 27 comprises a sensor member 29 mounted externally on the lock core 21. The sensor member 29 is mounted to the lock core 21 in such a manner that it rotates together with the lock core 21. The sensor member 29, which in this embodiment is a hall effect sensor, is arranged to detect at least one sensor target. A sensor target may be situated inside and/or outside the padlock body 3. In this embodiment a sensor target 31 form part of the projecting pin 17 of the padlock holder 11. The sensor target 31 comprises a magnetic portion that is configured to interact with the hall effect sensor 29 of the sensing device 27. In this embodiment the position sensing device 27 has one single sensor target 31. It is however appreciated that the position sensing device may comprise two or more sensor targets.

The position sensing device 27 is connected to the control unit of the lock assembly 1 in order to enable communication of lock core position data and lock position data to the programmable key 12. More specifically, the position sensing device 27 is arranged to detect when the lock core 21 is situated in the first lock core position, i.e. the position in which the padlock 3 is locked.

With reference to FIGS. 1A-E, the function of the electromechanical lock assembly 1 will described hereinafter.

Figure 1B:
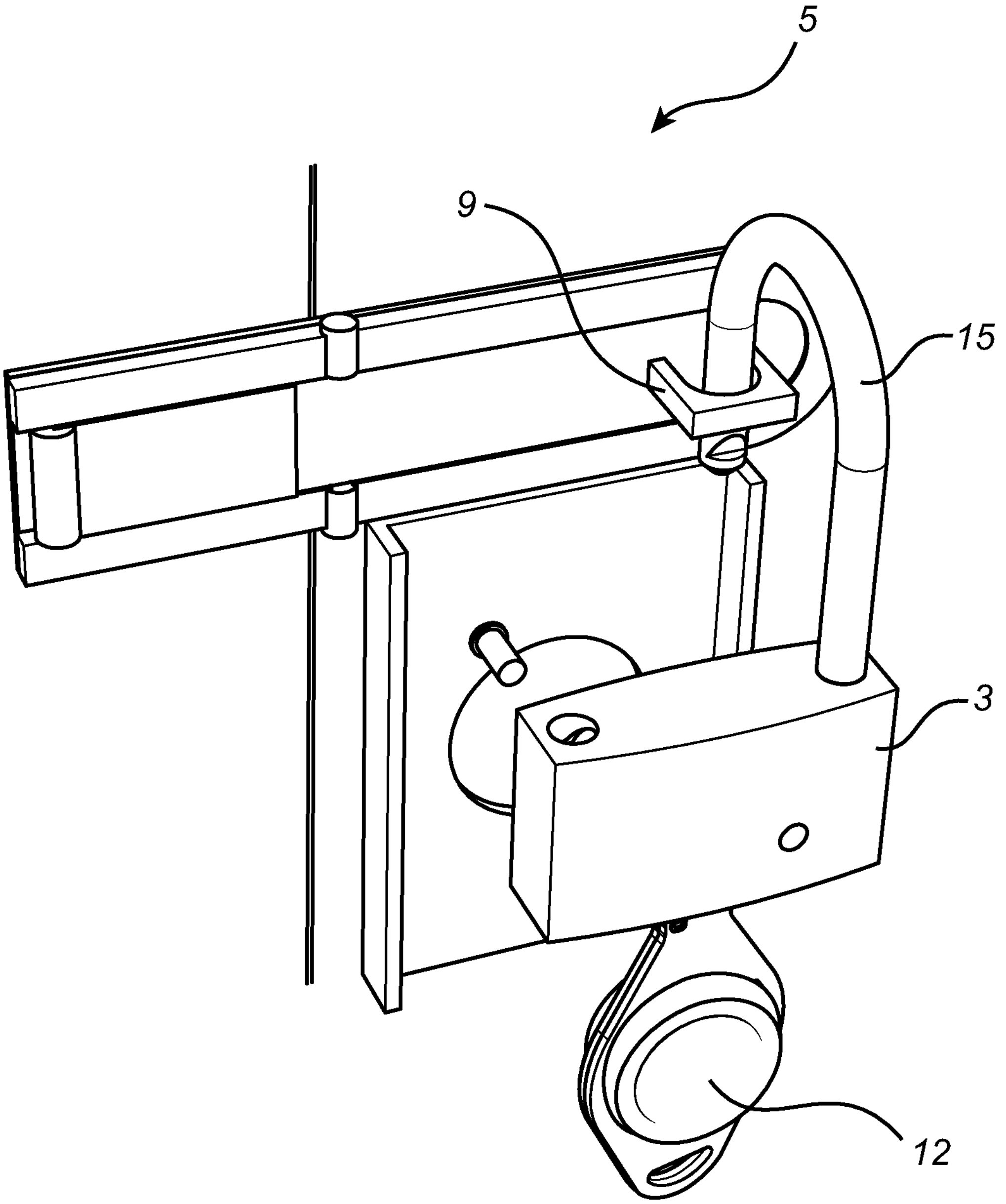
FIG. 1B-E are perspective views and illustrate the function of the electromechanical lock assembly shown in FIG. 1A.

FIG. 1B illustrates the padlock 3 in an unlocked state with a shackle leg inserted in the staple 9 of the padlock fitting 5 and an appropriate programmable key 12 inserted in the key receptacle of the padlock 3. Then, the padlock 3 is powered by the programmable key 12.

Figure 1C:
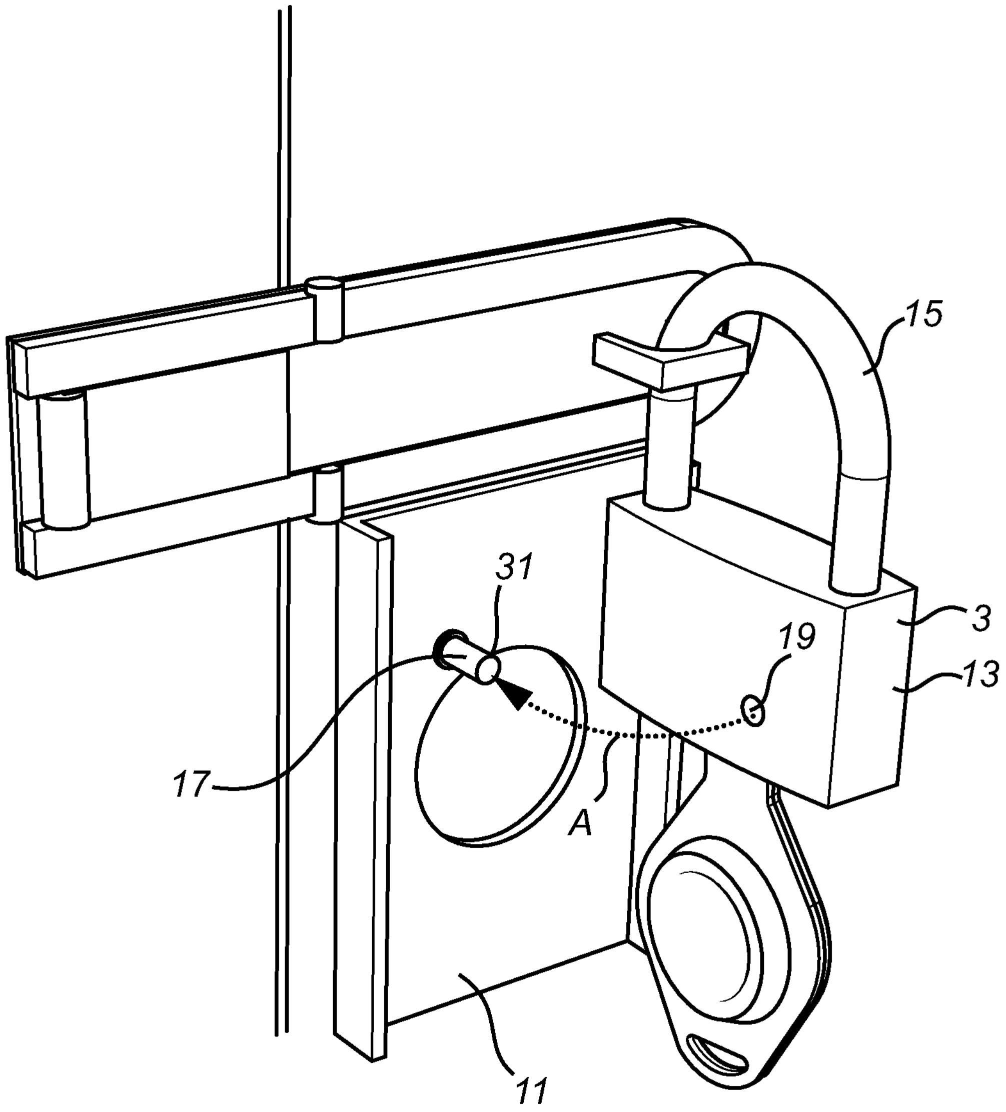

FIG. 1C illustrates the padlock 3 after insertion of the engagement portion 15*a* of the shackle 15 into the interior of the padlock 3, still in an unlocked state. The lock core 21 is then situated in the first lock core position. By turning the padlock 3 in a direction towards the projecting pin 17, as illustrated by the arrow A in FIG. 1C, the padlock 3 is moved to a predefined position in the padlock holder 11.

Figure 1D:
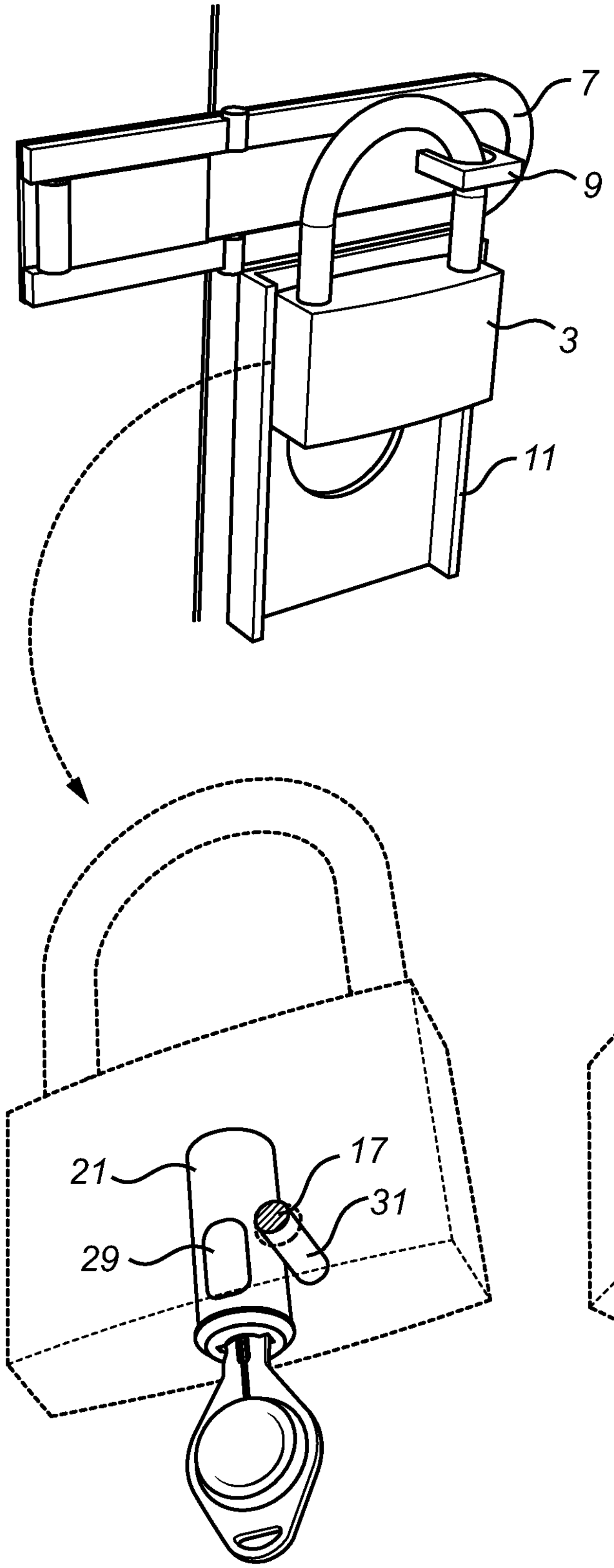

FIG. 1D illustrates the padlock 3 in the predefined position while still in an unlocked state. Then, the sensor member 29 does not detect the sensor target 31.

Figure 1E:
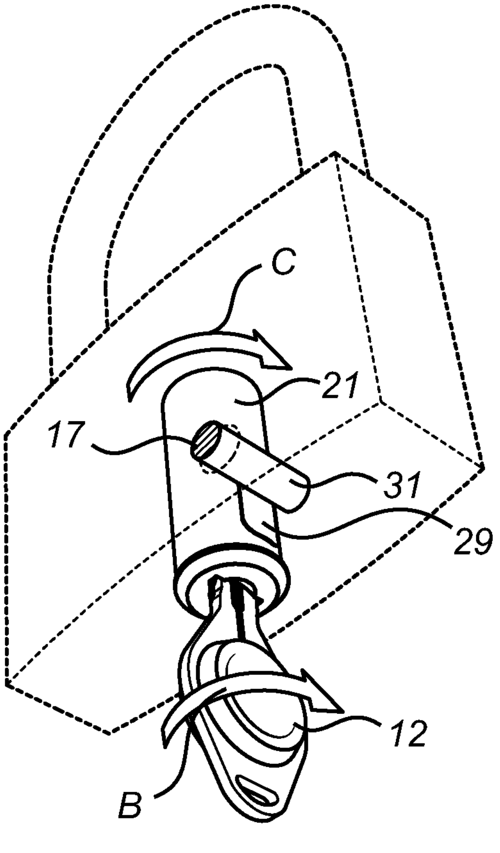

Upon turning of the appropriate key 12, as illustrated by arrow B in FIG. 1E, and thereby the lock core 21 as illustrated by arrow C in FIG. 1E, the lock core 21 is rotated to the second lock core position, which is illustrated in FIG. 1E, in which the padlock 3 is in a locked state. Then, the sensor member 29 detects the sensor target 31. Then position data, including lock core position data and padlock position data, is transmitted to the key 12. A confirmation that the padlock 3 is locked and situated in the predefined position, is thus communicated to the programmable key 12. Also, such a confirmation may be logged in a log file and transmitted to a cloud based access control system.

In case such a padlock, that is supposed to be locked, is, via absence of a confirmation that the padlock is locked and situated in the predefined position, detected to be unlocked, or locked but not situated in the predefined position, an alert may be transmitted to the programmable key 12.

Figure 2A:
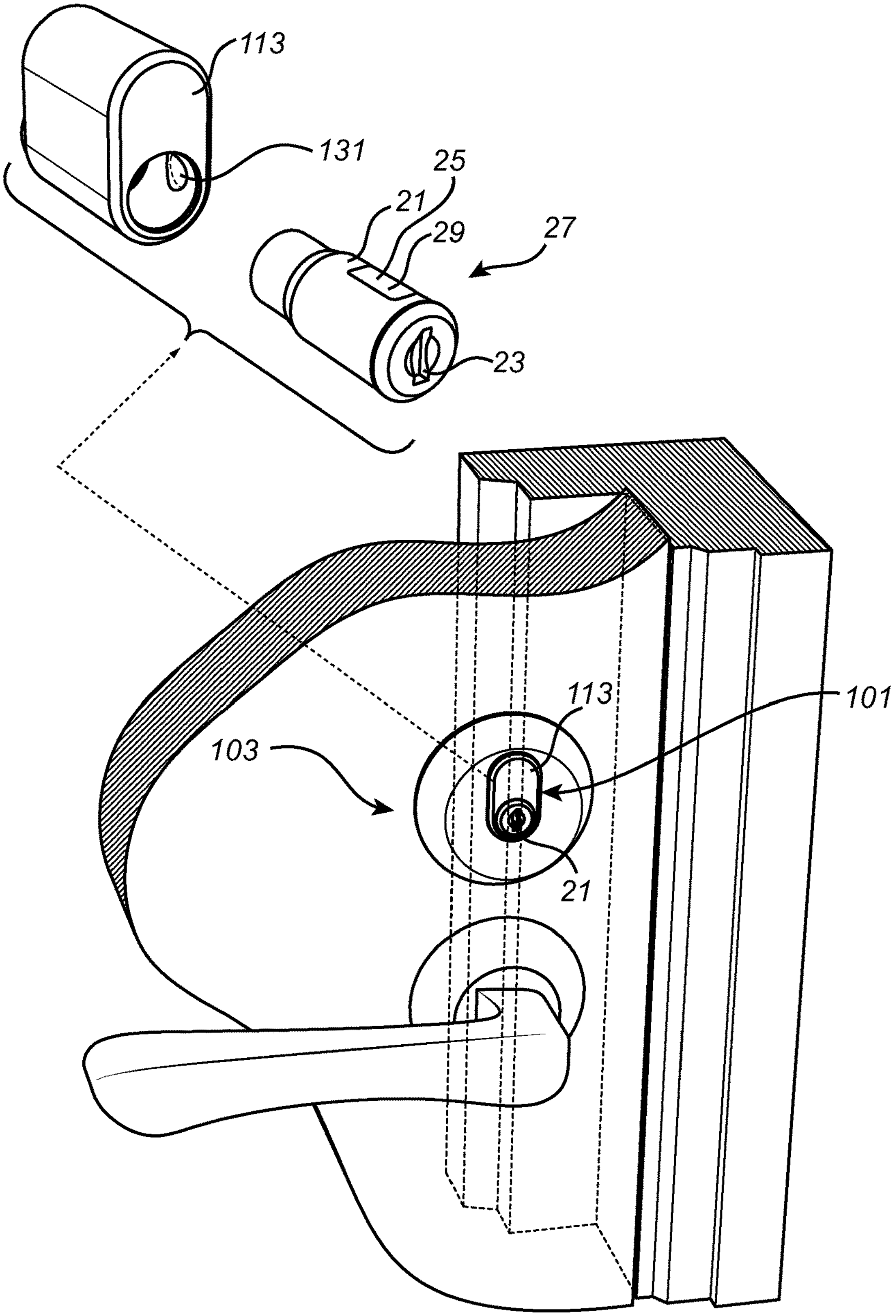
FIG. 2A is a perspective view showing an electromechanical lock assembly according to a second embodiment of the invention arranged at a door.

FIG. 2A illustrates an electromechanical lock assembly, in the form of an electromechanical lock cylinder 101, according to a second embodiment of the invention that forms part of an electromechanical lock 103 arranged at a door.

The electromechanical lock cylinder 101 is connected to an existing locking mechanism of the electromechanical lock 103.

The electromechanical lock cylinder 101 comprises a lock body, in the form of a cylinder body 113, a lock core 21 located within the cylinder body 113 and a lock operating member (not shown). The lock core 21 is selectively rotatable with respect to the cylinder body 113. The lock bolt operating member is configured to operate a lock bolt of the locking mechanism of the electromechanical lock 103 for locking and unlocking the lock 103. The electromechanical lock cylinder 101 is configured to be powered by and communicate with a programmable key.

The electromechanical lock assembly 101 further comprises a position sensing device 27 arranged to detect position data and transmit position data to a programmable key. In this embodiment the position sensing device 27 is arranged to detect a position of the lock core 21 in the lock body 113 and a position of the lock body 113. To this end the position sensing device 27 comprises a first sensor member 29 mounted externally on the lock core 21 and a second sensor member 130, illustrated in FIG. 2B, mounted to the door.

The first sensor member 29 is mounted to the lock core 21 in such a manner that it rotates together with the lock core 21. The first sensor member 29, which also in this embodiment is a hall effect sensor, is arranged to detect a at least one sensor target. In this embodiment a first sensor target 131 is situated inside the lock body 113. The first sensor target 131 comprises a magnetic portion that is configured to interact with the hall effect sensor 29 of the sensor device 27.

Figure 2B:
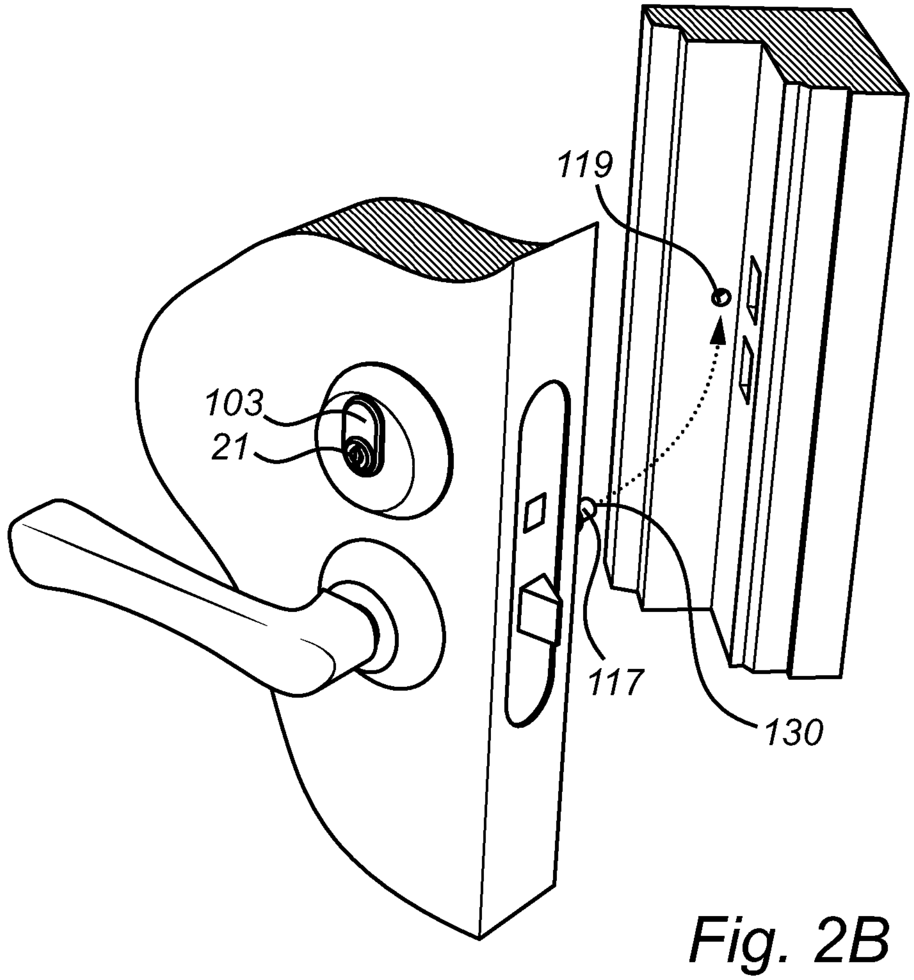
FIGS. 2B-C are perspective view and illustrate the function of the electromechanical lock assembly shown in FIG. 2A.

Now referring to FIG. 2B, the second sensor member 130 form part of a projecting portion, in the form of a projecting pin 117, that is configured to be received in a recess 119 formed in the door frame. The second sensor 130 is thus configured to detect a second sensor target (not shown) that is situated in the recess 119 and enables to detect that the door and thereby the lock cylinder 101 is located in a predefined position.

Each of the first sensor member 29 and the second sensor member 130 is connected to the control unit of the lock assembly 101 in order to enable communication of lock core position data and lock position data to a key. The position sensing device 27 is arranged to detect when the lock core 21 is situated in the first lock core position, i.e. the position in which the lock 103 is locked.

Figure 2C:
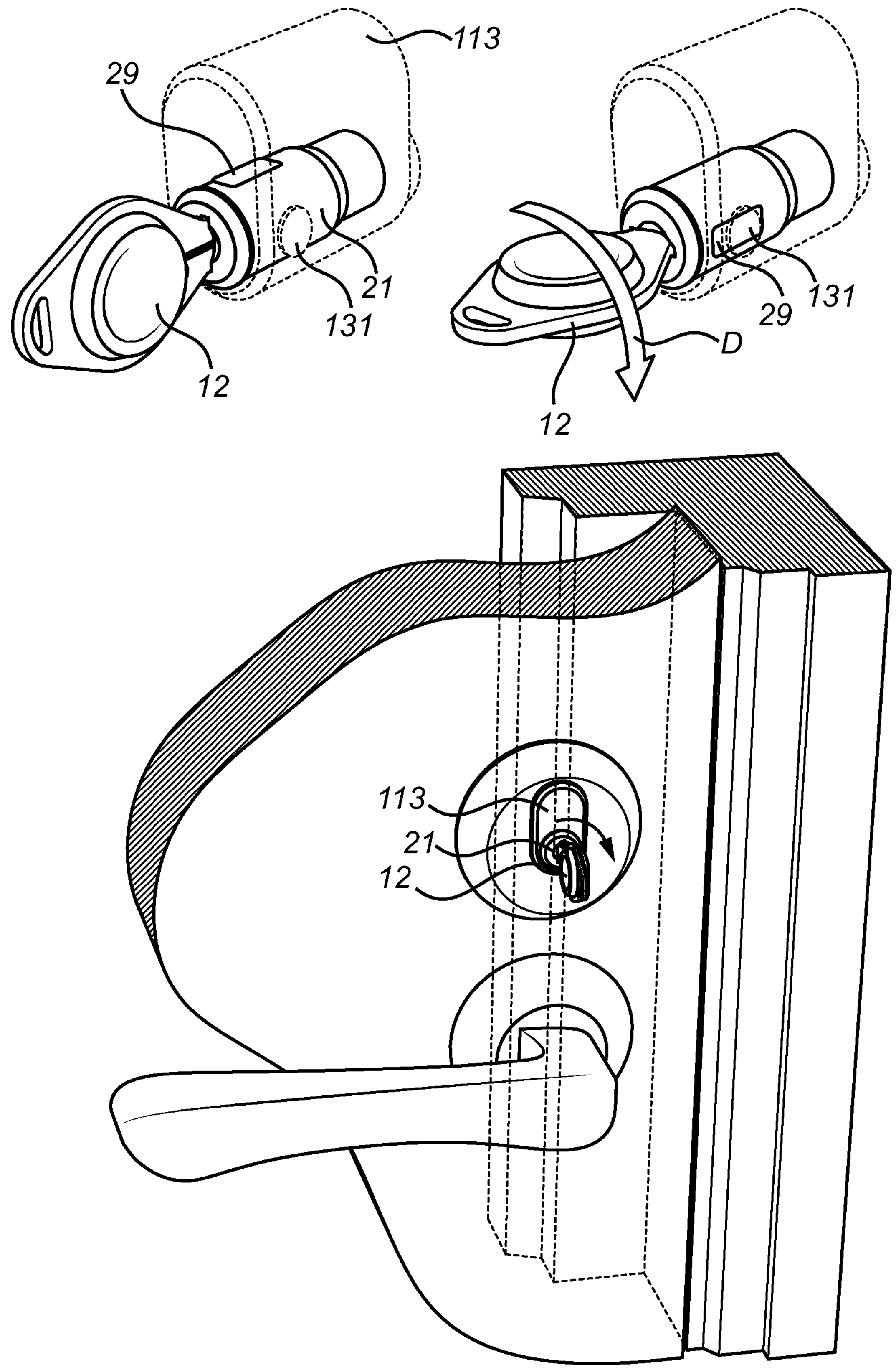

The lock core 21 is movable between a first lock core position, which corresponds to an unlocked state of the lock, and a second lock core position which corresponds to a locked state of the lock. Upon turning of the appropriate key 12, as illustrated by arrows in FIG. 2C the lock core 21 is rotated to the second lock core position. Then, the first sensor member detects the sensor target 131. Then position data, including lock core position data and lock position data, is transmitted to the key 12. A confirmation that the lock 103 is locked and situated in the predefined position, is thus communicated to the programmable key 12. Also, such a confirmation may be logged in a log file and transmitted to whereby data, including confirmation that the lock 103 is locked and located in the predefined position, is communicated to the programmable key.

If the lock is not locked, or locked but not positioned in the predefined position, an alert may be transmitted to the key and/or a mobile device, such as a mobile phone, held by a user of the key and/or a cloud based access control system and/or and administration unit.

A method of providing information about a status of an electromechanical lock 3, which lock is powered by a programmable key 12 upon the insertion thereof in a key receptacle 23 will now be described. In a first step position data is detected using a position sensing device 27. In this step, the position of the lock body 13 of the lock 3 and/or the position of the lock core 21 of the lock 3 may be detected. In a subsequent step, detected position data is transmitted to a programmable key 12 where it is logged in a log file.

Also, the log file may be transmitted to a cloud based access control system to alert an additional person to make sure that the electromechanical lock become locked in a proper manner or to events detected by the position sensing device.

In case the lock 3 has been locked in an incorrect manner, i.e. locked but not located in a correct position, an alert, e.g. in the form of a text message, is sent to a user of the programmable key via an app installed in a mobile device, such as a mobile phone. The alert may be triggered when the mobile device is located at a certain distance from the position of the lock 3 and/or after a predetermined time.

It will be appreciated that many variants of the above-described embodiments are possible within the scope of the appended patent claims.

The invention claimed is:

1. An electromechanical padlock assembly comprising a lock body, a lock core located at least partially within the lock body and selectively rotatable with respect to the lock body, the lock core comprising a key receptacle, a bolt operating member rotationally secured to the lock core and configured to move a lock bolt of a lock for locking and unlocking said lock, and a programmable key, wherein said electromechanical padlock assembly is configured to be powered upon insertion of the programmable key in said key receptacle, a position sensing device arranged to transmit position data to said programmable key, wherein said position sensing device comprises a sensor member mounted externally on the lock core and is arranged to detect at least one position of the lock core in the lock body, and further comprises a lock body holder configured external to the lock body to hold the lock body in a predefined position, the lock body holder comprising a projecting portion that is configured to be physically received through an opening formed in the lock body and that comprises a sensor target that is positioned within the interior of the lock body when the projecting portion is received through the opening formed in the lock body and configured to interact with the position sensing device, wherein the position sensing device is arranged to detect a lock body position.

2. The electromechanical padlock assembly according to claim 1, wherein a magnetic portion, or an inductive portion or a capacitive portion, or an optical portion or a contact portion is configured to interact with a sensor member of the position sensing device.

3. The electromechanical padlock assembly according to claim 1, wherein said position sensing device comprises a proximity sensor.

4. The electromechanical padlock assembly according to claim 3, wherein said position sensing device comprises a hall effect sensor.

5. The electromechanical padlock assembly according to claim 1, wherein said position sensing device comprises a contact sensor.

6. The electromechanical padlock assembly according to claim 1, wherein said electromechanical lock assembly further comprises a lock position indicator arranged to interact with said position sensing device.

7. The electromechanical padlock assembly according to claim 1, wherein a part of a shackle of said electromechanical padlock assembly forms an engagement portion arranged to interact with said position sensing device.

8. The electromechanical padlock assembly according to claim 1, wherein the sensor target is positioned within the interior of the lock body when the lock body is held in the predefined position by the lock body holder.

9. A method of providing information about a status of an electromechanical padlock, said electromechanical padlock having a lock body and being configured to be powered upon insertion of a programmable key in a key receptacle of the electromechanical padlock, said method comprising detecting position data using a position sensing device and a sensor target that forms part of a projecting portion of a padlock holder configured to hold the lock body in a predefined position, the projecting portion of the padlock holder insertable into the lock body through an opening formed in the lock body wherein the sensor target is within the lock body, said position data comprising at least one position of a lock core in the lock body and the position of the lock body of the electromechanical padlock, and transmitting said position data to said programmable key.

10. The method of providing information about a status of an electromechanical padlock according to claim 9, wherein the method further comprises logging position data and transmitting logged position data to a mobile device or an access control system.

11. The method of providing information about a status of an electromechanical padlock according to claim 9, wherein the method further comprises, upon absence of a confirmation that the padlock is locked and situated in a predefined position, sending an alert to a user of the programmable key.

12. The method of providing information about a status of an electromechanical padlock according to claim 9, wherein the method further comprises sending an alert to a user of the programmable key if it is detected that the electromechanical padlock is located in an incorrect position and/or if it is detected that the electromechanical padlock is unlocked when it is supposed to be locked.

* * * * *